United States Patent
Auslander et al.

(10) Patent No.: US 6,391,103 B1
(45) Date of Patent: May 21, 2002

(54) COLOR IMPARTING COMPOSITIONS FOR INK JET PRINTER INKS AND MACHINE READABLE INK COMPOSITIONS CONTAINING SAME

(75) Inventors: Judith Auslander, Westport; Richard A. Bernard, Norwalk; Claude Zeller, Monroe, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/496,372

(22) Filed: Feb. 2, 2000

(51) Int. Cl.7 ................................................ C09D 11/02
(52) U.S. Cl. ................ 106/31.27; 106/31.43; 106/31.49; 106/31.58
(58) Field of Search .................... 106/31.27, 31.49, 106/31.43, 31.58

(56) References Cited

U.S. PATENT DOCUMENTS

| 5,605,566 A | * | 2/1997 | Yui et al. | 106/31.58 |
| 5,766,327 A | * | 6/1998 | Maze | 106/31.58 |
| 5,833,744 A | * | 11/1998 | Breton et al. | 106/31.58 |
| 5,853,469 A | * | 12/1998 | Colt et al. | 106/31.58 |
| 5,925,176 A | * | 7/1999 | Rehman | 106/31.43 |
| 6,001,899 A | * | 12/1999 | Gundlach et al. | 106/31.43 |

FOREIGN PATENT DOCUMENTS

JP             62-567 A    *   1/1987

* cited by examiner

Primary Examiner—Helene Klemanski
(74) Attorney, Agent, or Firm—Ronald Reichman; Angelo N. Chaclas

(57) ABSTRACT

Color imparting compositions for ink jet printer inks, as well as inks with such color imparting compositions therein, which can be used in a commercially available ink jet printer or the ink jet printer of a postage metering system to print machine readable information based indicia, such as postage, on a substrate, such as an envelope, are disclosed. The color imparting composition includes a water soluble black colorant material adapted to absorb light in a wavelength range between about 400 to 650 nm, such as Reactive Black 31 dye or Direct Black 195 dye, and a water soluble cyan colorant material having a molar extinction coefficient of at least 10,000 at a wavelength maximum in the range of about 580 to 750 nm, such as Direct Blue 307, Direct Blue 199 or Acid Blue 9. The weight ratio of the black colorant material to the cyan colorant material in the color imparting composition is in the range of about 50 to 1 to about 5 to 6.

11 Claims, 5 Drawing Sheets

COLOR IMPARTING COMPOSITIONS FOR INK JET PRINTER INKS AND MACHINE READABLE INK COMPOSITIONS CONTAINING SAME

TECHNICAL FIELD

The present invention relates generally to inks. More particularly, the present invention relates to color imparting compositions for ink jet printer inks and inks formulated with same that are useful for printing machine readable indicia, such as postage.

BACKGROUND OF THE INVENTION

The Information-Based Indicia Program (IBIP) is a distributed trusted system originally proposed by the United States Postal Service (USPS). The IBIP requires printing large, high density, two dimensional (2-D) bar codes on mail pieces. The Postal Service expects the IBIP to provide cost-effective assurance of postage payment for each mail piece processed. However, such assurance is only as good as the printing and verification process within the IBIP.

Verification of Information-Based Indicia (IBI) is the process of proving that the postage evidenced on each IBI mail piece has been paid. A digital signature scheme has been devised to provide such evidence. The digital signature scheme for the IBI system provides a secure method of proving the validity, specifically the integrity and authenticity, of the data within the indicia. For the verification system to work efficiently, the indicia printed on an envelope constituting postage must be machine readable.

Postal indicia or franking machines have been developed that use digital printing technology to permit the use of variable information in postal indicia and to provide enhanced printing resulting in better indicia print quality. Better print quality of the postal indicia enables the postal indicia to be more efficiently read by optical character recognition equipment, bar code readers and other types of machine vision technology typically used in automatic sorting and postage verification machines. Poor print quality, in terms of precision and contrast, of the indicia printed on an envelope results in inefficient processing of mail pieces and leads to higher processing costs.

The introduction of digital printing technology for printing indicia or franking is limited, to some extent, by the limited existence of inks that are suitable for franking, and at the same time, are functional with specific ink jet technology. Piezoelectric ink jet inks which are water fast use different organic solvents, such as tripropylene glycol methyl ether or other glycol ethers, instead of water to improve the water fastness. The organic solvents are preferred because they dissolve or disperse colorants that are insoluble in water. However, ink jet printers contain a substantial number of parts, such as the inker foam, cartridge housing and printer base, made with plastic materials such as acrylonitrile styrene (AS), polymethylmethacrylate (PMMA), and acrylonitrile butadiene styrene (ABS). These plastics may be somewhat soluble in the preferred organic solvents, and therefore, the organic solvents in the inks could cause the plastic parts to fail. Accordingly, water is generally used as the ink solvent because the plastic ink jet printer parts are not soluble therein.

After the implementation of the IBIP, inks which met the requirements for franking and machine readability, among other specifications, and were suitable for printing postal indicia with bubble jet or piezoelectric technology, were no longer suitable because such inks have a relatively high "red" reflectance. For example, some inks that were suitable prior to IBIP, but no longer suitable after IBIP, used reactive black 31 or C.I. direct black 195 dyes as a black colorant materials. Prior art dyes using such materials as colorants do not necessarily have light absorbency characteristics that efficiently match the characteristics of scanners in the optical character readers that are now used by the postal services to read the printed postal indicia under the IBIP. These scanners typically include a red light filter, which is generally adapted to have a maximum for light transmission at about 630 nm and, in some cases a green light filter, which is generally adapted to have a maximum for light transmission at about 550 nm.

To determine the contrast signal for an indicia printed on a substrate, a Print Reflectance Difference (PRD) test has been devised. The PRD is the difference between the reflectance of the unprinted part of the substrate and the reflectance of the printed part of the substrate, as measured with a United States Postal Service Envelope Reflectance (ER) Meter. The USPS ER meter has green and red light filters. In ink jet inks which use these black colorant materials alone to provide color, the PRD values have been known to vary between 2.8 to 30 percent. Under the IBIP, such variations in Print Reflectance Difference values can cause longer read times to decode indicia because the print contrast varies so widely. The longer indicia read times lowers the overall efficiency of processing such indicia, and therefore, increases the cost of processing mail bearing such indicia.

It is therefore desirable to produce a color imparting composition for an ink which is suitable for use in an ink jet printer which has a low light reflectance (strong absorbency) when applied to a substrate in the wavelength range utilized by the optical character recognition devices which are used to scan such printed postage indicia.

SUMMARY OF THE INVENTION

In accordance with the present invention, colorant compositions for making ink jet printer inks which can be used to print machine readable indicia, such as postal indicia, are provided. The color imparting compositions generally comprise a water soluble black colorant material adapted to absorb light in a wavelength range between about 400 to 650nm, and a water soluble cyan colorant material having a molar extinction coefficient of at least 10,000 at a wavelength maximum in the range of about 580 to 750 nm. When used in an ink jet printer ink composition, the color imparting compositions yield an ink which has a low reflectivity of light in the wavelength regions typically used by the scanners incorporated in postage reading machines.

DETAILED DESCRIPTION

The present invention is directed to color imparting compositions for ink jet printer inks which can be used in a commercially available ink jet printer or the ink jet printer of a postage metering system to print machine readable information based indicia, such as postage, on a substrate, such as an envelope. The color imparting compositions of the present invention generally contain a water soluble black colorant material adapted to absorb light in a wavelength range between about 400 to 650 nm, such as Reactive Black 31 dye or Direct Black 195 dye, and a water soluble cyan colorant material having a molar extinction coefficient of at least 10,000 at a wavelength maximum in the range of about 580 to 750 nm, such as Direct Blue 307, Direct Blue 199, or Acid Blue 9 for example, and preferably at a wavelength maximum between 620 and 680 nm. Ink compositions containing the color imparting compositions of the present invention are described below by way of example and such compositions are compared to black ink compositions which are also described below by way of examples. As shown in the examples, the weight ratio of the black colorant material to the cyan colorant material in the color imparting mixtures is generally in the range of about 50 to 1 to about 5 to 6 where maximum improvement to the absorbency of the inks is observed.

EXAMPLE 1

A 5 percent Reactive Black 31 dye composition suitable for printing indicia with an ink jet printer was made by combining approximately 1.668 g of 15 percent solution of Duasyn Black KRL SF with approximately 3.338 g of an ink jet solvent system. The solvent system was formed as follows:

| INGREDIENT | (WT %) |
|---|---|
| Water | 55.6 |
| 2-pyrrolidone | 9.00 |
| Polyethylene Glycol | 22.4 |
| Triethylene Glycol Mono-n-butyl Ether | 6.20 |
| Polyvinylpyrrolidone (less than about 6000 mw) | 1.80 |

Reactive Black 31 dye can be obtained from companies such as Clariant Corp. located in Coventry, R.I. Reactive black 31 dye was selected because it has good water fastness and a high surface tension. This composition was drawn down onto a piece of commercially available copier paper using a K Control Coater 101 manufactured by RK Print-Coat Instruments Limited. The coating process is as described below.

Spoil paper was placed on the coating bed of the apparatus to absorb excess ink. A substrate to be coated was placed on the spoil paper and held in place with a clip. The setting bar was pressed down firmly to assure that the bar was flat and evenly in contact with the substrate. A wire wound coating bar (#1) was placed in the coater. A 5.08 cm piece of cellophane tape was placed horizontally across the substrate just below the draw down bar. Using a pipette, about 1 mL of sample was placed down uniformly across the cellophane tape. The K control Coater was set to speed setting number 10 and the bar was allowed to pass over the substrate to provide a uniform coating. The coated substrate was removed and allowed to dry.

Figure 1:
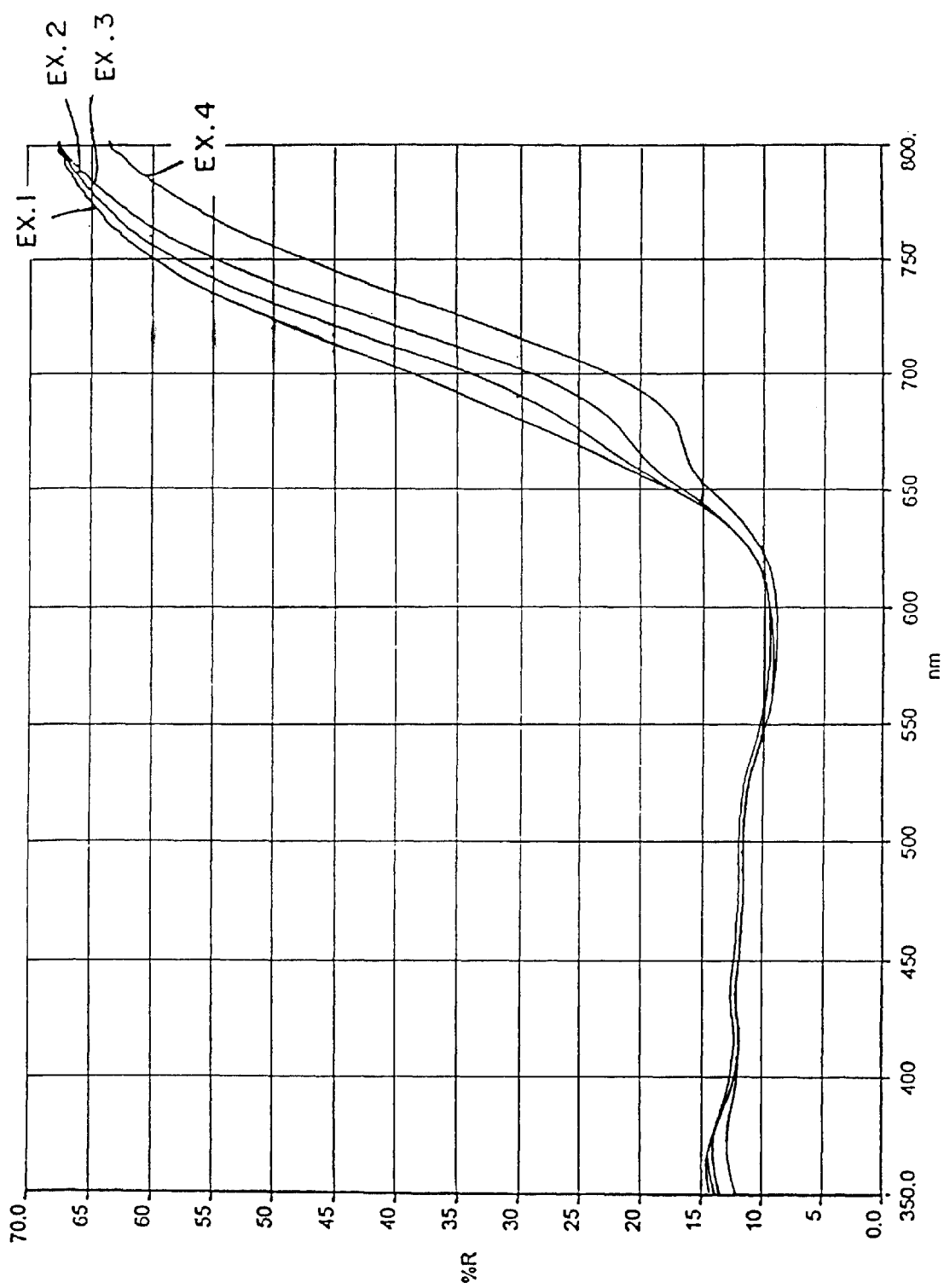
FIG. 1 is a graphical plot of reflectance values versus wavelength comparing ink jet ink compositions showing the effect of Direct Blue 307 dye on the reflectance of an ink formed with Reactive Black 31 dye.

The coated substrate exhibited an optical density of about 1.030 as measured by AS400 Densitometer from X-Rite with an orthochromatic filter. A plot of the reflectance versus wavelength of the composition of Example 1, obtained using a Perkin Elmer Lambda 900 spectrometer with an integrating sphere, is shown in FIG. 1. The PRD and print contrast ratio (PCR) values were measured for both the green and red filter of the Envelope Reflectance Meter which was supplied by the United States Postal Service. The PRD and PCR values for the green and red filters are listed in TABLE 1 below. Generally, this composition cannot meet all of the requirements of the USPS under its newly implemented IBI program because the indicia printed therewith reflect to much light relative to the substrate (envelope) upon which it is printed.

Color Imparting Mixture—Reactive Black 31 & Direct Blue 307

To determine the effect of the addition of a Direct Blue 307 dye on the reflectivity of the 5 percent Reactive Black 31 dye ink composition described in Example 1, several ink compositions containing Direct Blue 307 dye of differing concentrations were made. These compositions are described in Examples 2 through 4.

EXAMPLE 2

An ink jet printer ink composition was made by combining about 1.668 g of the Duasyn Black KRL SF 15 percent Reactive Black 31 dye solution with 3.333 grams of the solvent system and about 0.005 g of Direct Blue 307 dye. The resulting concentration of Direct Blue 307 in the composition was about 0.1 weight percent. The C.I. Direct Blue 307 dye was obtained from Avecia, Inc. of 1405 Foulk Road, P.O. Box 15457, Wilmington, Del. 19850–5457. This composition was drawn down onto a piece of commercially available copier paper using the technique described in Example 1. A plot of the reflectance versus wavelength of the composition of Example 2 is shown in FIG. 1. The optical density and the PRD and PCR values for the green and red filters are listed in TABLE 1 below.

EXAMPLE 3

An ink jet printer ink composition was made by combining about 1.668 g of the Duasyn Black KRL SF 15 percent Reactive Black 31 dye solution with 3.323 grams of the solvent system and about 0.015 g of Direct Blue 307 dye. The resulting concentration of Direct Blue 307 in the composition was about 0.3 weight percent. This composition was drawn down onto a piece of commercially available copier paper as described in Example 1. A plot of the reflectance versus wavelength of the composition of Example 3 is shown in FIG. 1. The optical density and the PRD and PCR values for the green and red filters are listed in TABLE 1 below.

EXAMPLE 4

An ink jet printer ink composition was made by combining about 1.668 g of the Duasyn Black KRL SF 15 percent Reactive Black 31 dye solution with 3.303 grams of the solvent system and about 0.035 g of Direct Blue 307 dye. The concentration of Direct Blue 307 in the composition was about 0.7 weight percent. This composition was drawn down onto a piece of commercially available copier paper under the same procedure as described above. A plot of the reflectance versus wavelength of the composition of Example 4 is shown in FIG. 1. The optical density and the PRD and PCR values for the green and red filters are listed in TABLE 1 below.

TABLE 1

| Ex. No. | Wt % DB 307 | Optical Density | PRD Green | PCR Green | PRD Red | PCR Red |
|---|---|---|---|---|---|---|
| Ex. 1 | 0% | 0.97 | 41% | .55 | 50% | .65 |
| Ex. 2 | 0.1% | 0.960 | 40% | .54 | 53% | .69 |
| Ex. 3 | 0.3% | 0.960 | 42% | .56 | 56% | .73 |
| Ex. 4 | 0.7% | 0.960 | 49% | .65 | 58% | .77 |

Comparing the several reflectance versus wavelength plots of the various compositions in FIG. 1 shows that the addition of the Direct Blue 307 dye material to an ink containing only black colorant material significantly reduced the reflectance of the ink composition in the 650 to 680 nm region and provided an ink composition with a generally flattened overall spectral reflectance. The reduction in reflectance in the 650 to 680 nm region increased as the concentration of the Direct Blue 307 dye material in the Reactive Black 31 ink composition of Example 1 increased. The optical density of the ink compositions increased as concentration of the colorant materials increased. As shown in TABLE 1, the PRD and PCR values for the green and red filters also increased as the concentration of the Direct Blue 307 dye increased. The higher PRD and PCR values are desirable when the objective is to provide an ink composition which is more efficiently machine readable.

As is well known in the art, any given perceived color can be characterized using any one of the color spaces, such as CIELAB. In the CIELAB color space, a color is defined using three terms L*, a*, and b*. L* defines the lightness of a color, and it ranges from zero (black) to 100 (white). The terms a* and b*, together, define the hue. The term a* ranges from a negative number (green) to a positive number (red). The term b* ranges from a negative number (blue) to a positive number (yellow). The color imparting compositions generally described above are perceived as a black color to the naked eye.

The values for the CIELAB color space terms L*, a* and b* colors for Examples 1 through 4 are provided in Table 2. The table shows that the L* value was similar as the Direct Blue 307 concentration increased in the ink. The a* and b* values decreased as the Direct Blue 307 concentration increased in the ink.

TABLE 2

| Ex. No. | L* | a* | b* |
|---|---|---|---|
| Ex. 1 | 38.40 | 2.14 | -3.78 |
| Ex. 2 | 38.80 | 1.69 | -4.03 |
| Ex. 3 | 38.43 | 1.09 | -4.31 |
| Ex. 4 | 38.27 | 0.07 | -4.79 |

Color Imparting Mixture—Reactive Black 31 & Direct Blue 199

To determine the effect of the addition of a Direct Blue 199 dye on the reflectivity of the 5 percent Reactive Black 31 dye ink composition described in Example 1, several compositions containing Direct Blue 199 dye of differing concentrations were made. These compositions are described in Examples 5 through 10.

EXAMPLE 5

Figure 2:
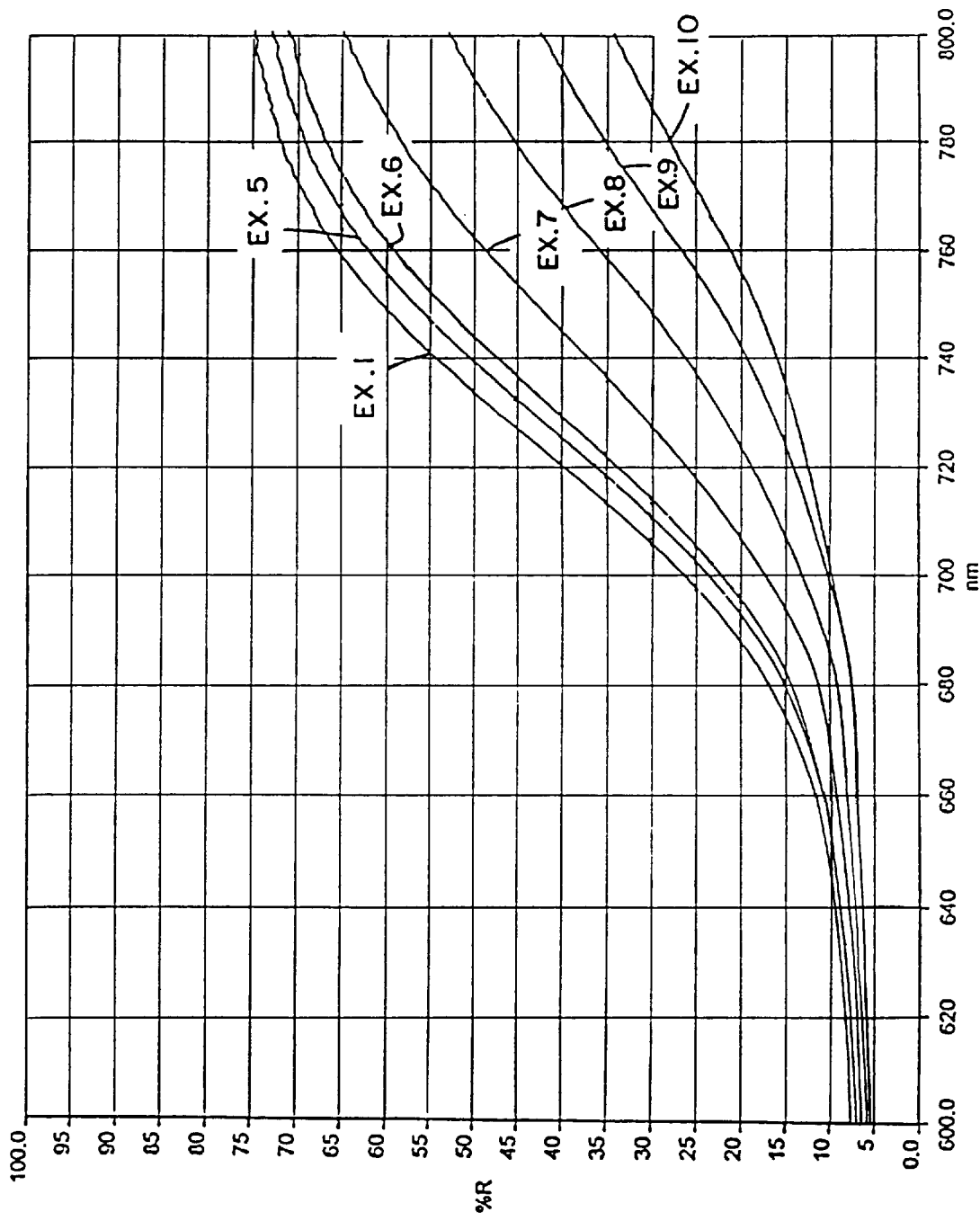
FIG. 2 is a graphical plot of reflectance values versus wavelength comparing ink jet ink compositions showing the effect of Direct Blue 199 dye on the reflectance of an ink formed with Reactive Black 31 dye.

A ink jet printer ink composition was made by combining about 1.668 g of the Duasyn Black KRL SF 15 percent Reactive Black 31 dye solution with 3.333 grams of the solvent system and about 0.005 g of Direct Blue 199 dye. The resulting concentration of Direct Blue 199 in the composition was about 0.1 weight percent. The Direct Blue 199 dye (Projet Cyan 1) is available from Zeneca Specialist Colours, New Castle, Del. This composition was drawn down onto a piece of commercially available copier paper using the technique described in Example 1. A plot of the reflectance versus wavelength of the composition of Example 5 is shown in FIG. 2. The optical density and the PRD and PCR values for the green and red filters are listed in TABLE 3 below.

EXAMPLE 6

Another ink jet printer ink composition was made by combining about 1.668 g of the Duasyn Black KRL SF 15 percent Reactive Black 31 dye solution with 3.323 grams of the solvent system and about 0.015 g of Direct Blue 199 dye. The resulting concentration of Direct Blue 199 in the composition was about 0.3 weight percent. This composition was drawn down onto a piece of commercially available copier paper using the technique described in Example 1. A plot of the reflectance versus wavelength of the composition of Example 6 is shown in FIG. 2. The optical density and the PRD and PCR values for the green and red filters are listed in TABLE 3 below.

EXAMPLE 7

An ink jet printer ink composition was made by combining about 1.668 g of the Duasyn Black KRL SF 15 percent Reactive Black 31 dye solution with 3.303 grams of the solvent system and about 0.035 g of Direct Blue 199 dye. The resulting concentration of Direct Blue 199 in the composition was about 0.7 weight percent. This composition was drawn down onto a piece of commercially available copier paper using the technique described in Example 1. A plot of the reflectance versus wavelength of the composition of Example 7 is shown in FIG. 2. The PRD and PCR values for the green and red filters and the optical density are listed in TABLE 3 below.

EXAMPLE 8

An ink jet printer ink composition was made by combining about 1.668 g of the Duasyn Black KRL SF 15 percent Reactive Black 31 dye solution with 3.238 grams of the solvent system and about 0.1 g of Direct Blue 199 dye. The resulting concentration of Direct Blue 199 in the composition was about 2.0 weight percent. This composition was drawn down onto a piece of commercially available copier paper using the technique described in Example 1. A plot of the reflectance versus wavelength of the composition of Example 8 is shown in FIG. 2. The PRD and PCR for the green and red filters are listed in TABLE 3 below.

EXAMPLE 9

Another ink jet printer ink composition was made by combining about 1.668 g of the Duasyn Black KRL SF 15 percent Reactive Black 31 dye solution with 3.138 grams of the solvent system and about 0.2 g of Direct Blue 199 dye. The resulting concentration of Direct Blue 199 in the composition was about 4.0 weight percent. This composition was drawn down onto a piece of commercially available copier paper using the technique described in Example 1. A plot of the reflectance versus wavelength of the composition of Example 9 is shown in FIG. 2. The optical density and the PRD and PCR values for the green and red filters are listed in TABLE 3 below.

EXAMPLE 10

An ink jet printer ink composition was made by combining about 1.668 g of the Duasyn Black KRL SF 15 percent Reactive Black 31 dye solution with 3.038 grams of the solvent system and about 0.3 g of Direct Blue 199 dye. The resulting concentration of Direct Blue 199 in the composition was about 6.0 weight percent. This composition was drawn down onto a piece of commercially available copier paper using the technique described in Example 1. A plot of the reflectance versus wavelength of the composition of Example 10 is shown in FIG. 2. The PRD and PCR values for the green and red filters as well as the optical density are listed in TABLE 3 below.

TABLE 3

| Ex. No. | Wt % DB 199 | Optical Density | PRD Green | PCR Green | PRD Red | PCR Red |
|---|---|---|---|---|---|---|
| Ex. 1 | 0% | 1.030 | 49% | .65 | 54% | .72 |
| Ex. 5 | 0.1% | 1.050 | 49% | .65 | 54% | .72 |
| Ex. 6 | 0.3% | 1.040 | 49% | .65 | 56% | .74 |
| Ex. 7 | 0.7% | 1.045 | 49% | .65 | 58% | .77 |
| Ex. 8 | 2% | 1.070 | 50% | .66 | 63% | .84 |
| Ex. 9 | 4% | 1.105 | 50% | .66 | 65% | .86 |
| Ex. 10 | 6% | 1.080 | 52% | .69 | 66% | .88 |

Comparing the several reflectance versus wavelength plots of the various compositions in FIG. 2 shows that the addition of the Direct Blue 199 dye material also significantly reduced the reflectance of the ink composition containing Reactive Black 31 dye in the 650 to 760 nm region, resulting in a flatter reflectance across the spectrum. The reduction in reflectance increased as the concentration of the Direct Blue 199 dye in the Reactive Black 31 ink composition of Example 1 increased. The optical density of the ink compositions increased as the concentration of Direct Blue 199 increased, up to about 6 weight percent. As shown in TABLE 3, the PRD and PCR values for the green filter didn't change until the concentration of Direct Blue 199 exceeded 0.7 weight percent. The PRD and PCR values for the red filter increased once the concentration of Direct Blue 199 exceeded 0.1 weight percent.

The values for the CIELAB color space terms L*, a* and b* colors for Examples 1 and 5 through 10 are provided in Table 4. The table shows that the L* value generally decreased as the Direct Blue 199 concentration increased. The a* and b* values decreased as the Direct Blue 199 concentration increased.

TABLE 4

| Ex. No. | L* | a* | b* |
|---|---|---|---|
| Ex. 1 | 38.40 | 2.14 | -3.78 |
| Ex. 5 | 36.85 | 1.84 | -3.80 |
| Ex. 6 | 36.13 | 1.10 | -4.24 |
| Ex. 7 | 36.07 | -0.05 | -5.05 |
| Ex. 8 | 33.54 | -1.58 | -6.72 |
| Ex. 9 | 32.56 | -2.58 | -8.46 |
| Ex. 10 | 33.82 | -2.83 | -8.59 |

To investigate the effect of the addition of the aforementioned cyan colorant materials on reducing the reflectance of an ink composition for an ink jet printer containing Direct Black 195 dye as a black colorant material instead of Reactive Black 31, several different ink compositions were made. Direct Black 95 may be obtained from Avecia Inc., 1405 Foulk Road, P.O. Box 15457, Wilmington, Del. 19850–5457. The exemplary ink compositions are described in the several examples below.

EXAMPLE 11

A 5 weight percent Direct Black 195 dye composition suitable for printing indicia with an ink jet printer was made by combining approximately 3.125 g of an 8 percent solution of Projet Fast Black 2 (Direct Black 195) dye with approximately 1.875 g of the ink jet solvent system described in Example 1.

Direct Black 195 can be obtained from companies such as Avecia, Inc. This ink composition was drawn down onto a piece of commercially available copier paper using the K Control Coater 101 manufactured by RK Print-Coat Instruments Limited as described above in Example 1.

Figure 3:
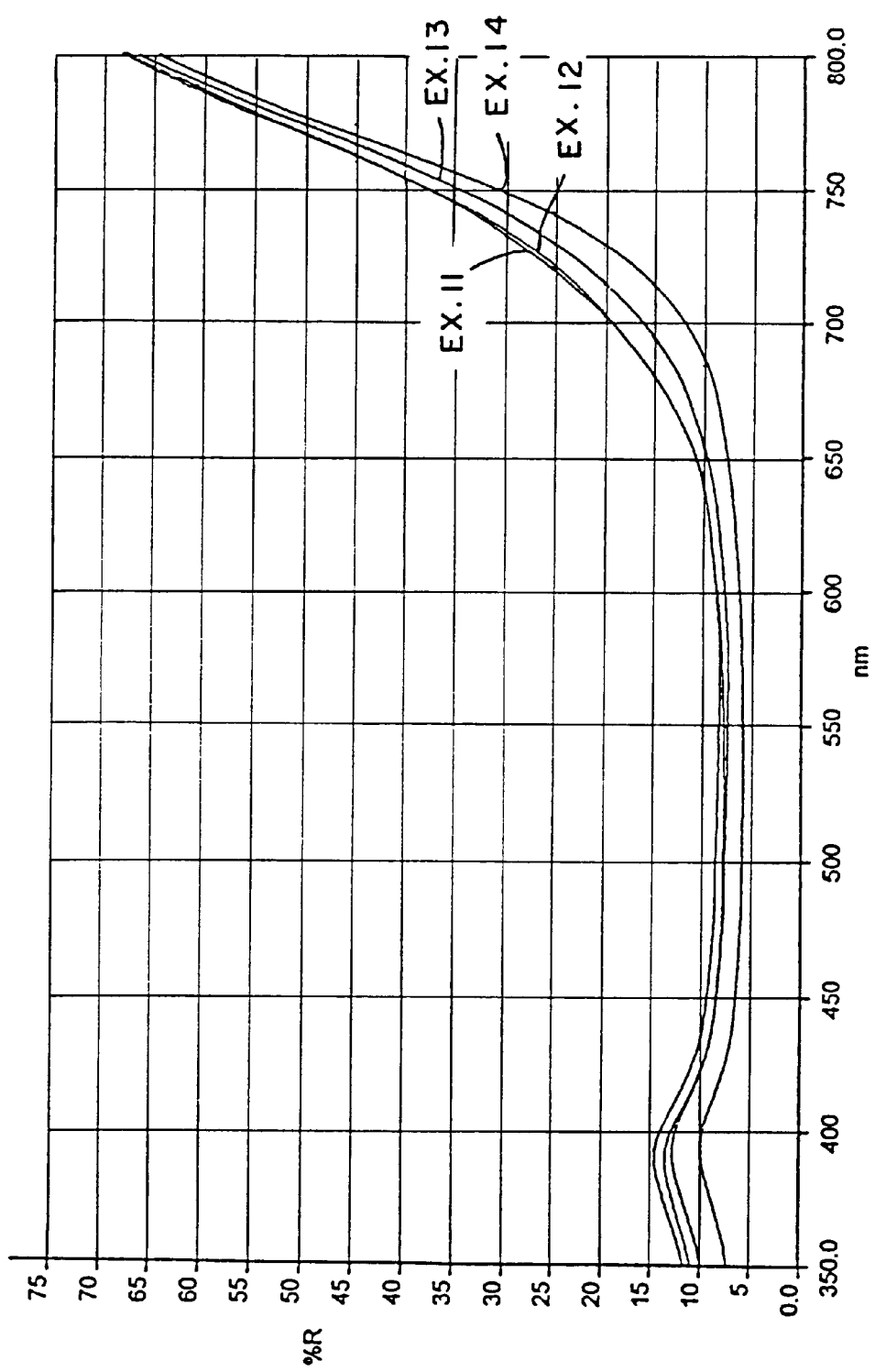
FIG. 3 is a graphical plot of reflectance values versus wavelength comparing ink jet ink compositions showing the effect of Direct Blue 307 dye on the reflectance of an ink formed with Direct Black 195 dye.

The coated substrate exhibited an optical density of about 1.100 as measured by the AS400 Densitometer from X-Rite with an orthochromatic filter. A plot of the reflectance versus wavelength of the composition of Example 12, obtained using a Perkin Elmer Lambda 900 spectrometer with an integrating sphere, is shown in FIG. 3. The PRD and PCR were measured for both the green and red filter of the Envelope Reflectance Meter. The PRD and PCR values for the green and red filters are listed in TABLE 5 below. Generally, this composition, like the Reactive Black 31 composition, cannot meet all of the requirements of the USPS under its newly implemented IBI program.

Color Imparting Mixture—Reactive Black 31 & Direct Blue 307

To investigate the effect of the addition of a Direct Blue 307 dye on the reflectivity of the 5 percent Direct Black 195 dye ink composition described in Example 12, several ink compositions containing Direct Blue 307 dye of differing concentrations were made. The Direct Blue 307 dye containing compositions are described in Examples 12 through 14.

EXAMPLE 12

An ink jet printer ink composition was made by combining about 3.125 g of the 8 percent Projet Fast Black 2 solution with 1.870 g of the solvent system and about 0.005 g of Direct Blue 307 dye. The resulting concentration of Direct Blue 307 in the composition was about 0.1 weight percent. This composition was drawn down onto a piece of commercially available copier paper using the technique described in Example 1. A plot of the reflectance versus wavelength of the composition of Example 12 is shown in FIG. 3. The PRD and PCR values for the green and red filters and the optical density are listed in TABLE 5 below.

EXAMPLE 13

An ink jet printer ink composition was made by combining about 3.125 g of the 8 percent Projet Fast Black 2 solution with 1.870 g of the solvent system and about 0.015 g of Direct Blue 307 dye. The resulting concentration of Direct Blue 307 in the composition was about 0.3 weight percent. This composition was drawn down onto a piece of commercially available copier paper using the technique described in Example 1. A plot of the reflectance versus wavelength of the composition of Example 13 is shown in FIG. 3. The optical density and the PRD and PCR values for the green and red filters are listed in TABLE 5 below.

EXAMPLE 14

An ink jet printer ink composition was made by combining about 3.125 g of the 8 percent Projet Fast Black 2 solution with 1.870 g of the solvent system and about 0.035 g of Direct Blue 307 dye. The resulting concentration of Direct Blue 307 in the composition was about 0.7 weight percent. This composition was drawn down onto a piece of commercially available copier paper using the technique described in Example 1. A plot of the reflectance versus wavelength of the composition of Example 14 is shown in FIG. 3. The PRD and PCR values for the green and red filters and the optical density are listed in TABLE 5 below.

TABLE 5

| Ex. No. | Wt % DB 307 | Optical Density | PRD Green Filter | PCR Green Filter | PRD Red Filter | PCR Red Filter |
|---|---|---|---|---|---|---|
| Ex. 11 | 0% | 1.100 | 43% | .58 | 59% | .77 |
| Ex. 12 | 0.1% | 1.090 | 43% | .58 | 58% | .76 |
| Ex. 13 | 0.3% | 1.140 | 43% | .58 | 61% | .80 |
| Ex. 14 | 0.7% | 1.240 | 44% | .59 | 63% | .82 |

Comparing the several reflectance versus wavelength plots of the various compositions in FIG. 3 shows that the addition of the Direct Blue 307 dye material also significantly reduced the reflectance of the ink composition containing Direct Black 195 dye in the 650 to 725 nm region, and of course, flattened the overall reflectance versus wavelength curve. The reduction in reflectance increased as the concentration of the Direct Blue 307 dye in the Direct Black 195 ink composition of Example 11 increased. The optical density of the ink compositions generally increased as Direct Blue 307 concentration increased. As shown in TABLE 5, the PRD and PCR values for the green and red filters increased only slightly as the concentration of the Direct Blue 307 dye increased.

The values for the CIELAB color space terms L*, a* and b* colors for Examples 11 through 14 are provided in Table 6. The table shows that the L* value decreased as the Direct Blue 307 concentration increased. The a* and b* values decreased as the Direct Blue 307 concentration increased.

TABLE 6

| Ex No. | L* | a* | b* |
|---|---|---|---|
| Ex. 11 | 34.27 | 4.32 | −1.98 |
| Ex. 12 | 35.15 | 3.37 | −3.37 |
| Ex. 13 | 33.32 | 3.39 | −3.19 |
| Ex. 14 | 29.60 | 3.39 | −2.50 |

Color Imparting Mixture—Direct Black 195 & Direct Blue 199

To investigate the effect of the addition of the aforementioned Direct Blue 199 on reducing the reflectance of an ink composition for an ink jet printer containing Direct Black 195 dye as a black colorant material, several different ink compositions were made. The exemplary ink compositions are described in examples 15 through 20 below.

EXAMPLE 15

Figure 4:
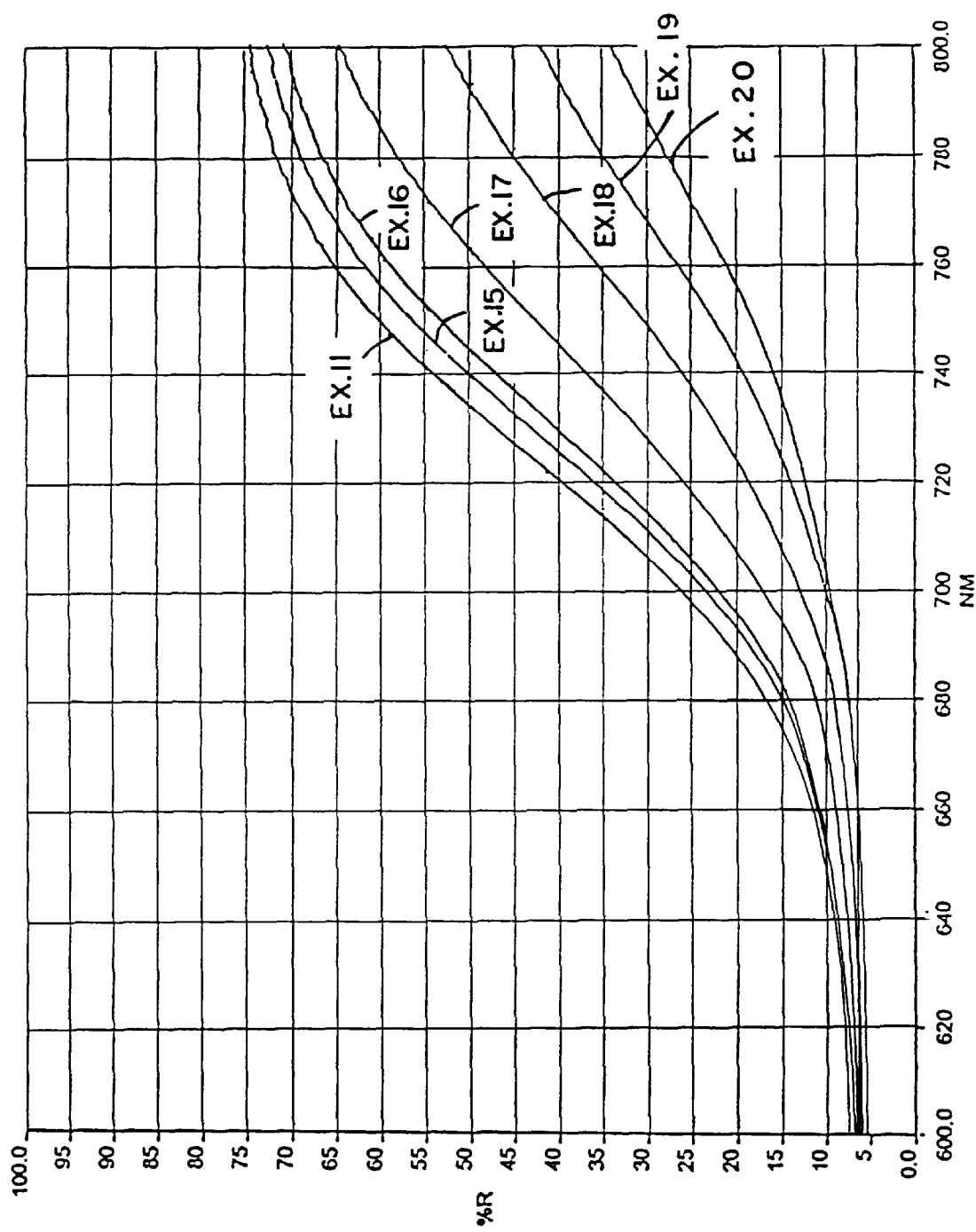
FIG. 4 is a graphical plot of reflectance values versus wavelength comparing ink jet ink compositions showing the effect of Direct Blue 199 dye on the reflectance of an ink formed with Direct Black 195 dye.

An ink jet printer ink composition was made by combining about 3.125 g of the 8 percent Projet Fast Black 2 solution with 1.870 g of the solvent system and about 0.005 g of Direct Blue 199 dye. The resulting concentration of Direct Blue 199 in the composition was about 0.1 weight percent. This composition was drawn down onto a piece of commercially available copier paper using the technique described in Example 1. A plot of the reflectance versus wavelength of the composition of Example 15 is shown in FIG. 4. The PRD and PCR values for the green and red filters and the optical density value are listed in TABLE 7 below.

EXAMPLE 16

An ink jet printer ink composition was made by combining about 3.125 g of the 8 percent Projet Fast Black 2 solution with 1.860 g of the solvent system and about 0.015 g of Direct Blue 199 dye. The resulting concentration of Direct Blue 199 in the composition was about 0.3 weight percent. This composition was drawn down onto a piece of commercially available copier paper using the technique described in Example 1. A plot of the reflectance versus wavelength of the composition of Example 16 is shown in FIG. 4. The PRD and PCR values for the green and red filters and the optical density value are listed in TABLE 7 below.

EXAMPLE 17

An ink jet printer ink composition was made by combining about 3.125 g of the 8 percent Projet Fast Black 2 solution with 1.840 g of the solvent system and about 0.035 g of Direct Blue 199 dye. The resulting concentration of Direct Blue 199 in the composition was about 0.7 weight percent. This composition was drawn down onto a piece of commercially available copier paper using the technique described in Example 1. A plot of the reflectance versus wavelength of the composition of Example 17 is shown in FIG. 4. The optical density and PRD and PCR values for the green and red filters are listed in TABLE 7 below.

EXAMPLE 18

An ink jet printer ink composition was made by combining about 3.125 g of the 8 percent Projet Fast Black 2 solution with 1.775 g of the solvent system and about 0.1 g of Direct Blue 199 dye. The resulting concentration of Direct Blue 199 in the composition was about 2.0 weight percent. This composition was drawn down onto a piece of commercially available copier paper using the technique described in Example 1. A plot of the reflectance versus wavelength of the composition of Example 18 is shown in FIG. 4. The optical density and PRD and PCR values for the green and red filters for this composition are listed in TABLE 7 below.

EXAMPLE 19

An ink jet printer ink composition was made by combining about 3.125 g of the 8 percent Projet Fast Black 2 solution with 1.675 g of the solvent system and about 0.2 g of Direct Blue 199 dye. The resulting concentration of Direct Blue 199 in the composition was about 4.0 weight percent. This composition was drawn down onto a piece of commercially available copier paper using the technique described in Example 1. A plot of the reflectance versus wavelength of the composition of Example 19 is shown in FIG. 4. The optical density and PRD and PCR values for the green and red filters for this composition are listed in TABLE 7 below.

EXAMPLE 20

An ink jet printer ink composition was made by combining about 3.125 g of the 8 percent Projet Fast Black 2 solution with 1.575 g of the solvent system and about 0.3 g of Direct Blue 199 dye. The resulting concentration of Direct Blue 199 in the composition was about 6.0 weight percent. This composition was drawn down onto a piece of commercially available copier paper using the technique described in Example 1. A plot of the reflectance versus wavelength of the composition of Example 20 is shown in FIG. 4. The PRD and PCR values for the green and red filters as well as the optical density value for this composition are listed in TABLE 7 below.

TABLE 7

| Ex. No. | Wt % DB 199 | Optical Density | PRD Green | PCR Green | PRD Green | PCR Green |
|---|---|---|---|---|---|---|
| Ex. 11 | 0% | 1.100 | 49% | .65 | 57% | .75 |
| Ex. 15 | 0.1% | 1.100 | 49% | .65 | 58% | .76 |
| Ex. 16 | 0.3% | 1.115 | 49% | .65 | 59% | .77 |
| Ex. 17 | 0.7% | 1.130 | 50% | .66 | 61% | .80 |
| Ex. 18 | 2% | 1.145 | 51% | .68 | 65% | .85 |
| Ex. 19 | 4% | 1.150 | 53% | .70 | 67% | .88 |
| Ex. 20 | 6% | 1.220 | 54% | .72 | 69% | .90 |

Comparing the several reflectance versus wavelength plots of the various compositions in FIG. 4 shows that the addition of the Direct Blue 199 dye material also significantly reduced the reflectance of the ink composition containing Direct Black 195 dye in the 650 to 750 nm region. The reduction in reflectance increased as the concentration of the Direct Blue 199 dye in the Direct Black 195 ink composition of Example 11 increased. The optical density of the ink compositions increased as the concentration of Direct Blue 199 dye increased, except when the concentration reached 6 weight percent. As shown in TABLE 7, the PRD and PCR for the green filter increased once the concentration of Direct Blue 199 exceeded 0.3 weight percent, but the PRD and PCR values for the red filter increase as the concentration of the Direct Blue 199 dye increased in the ink composition.

The values for the CIELAB color space terms L*, a* and b* colors for Examples 11 and 15 through 20 are provided in Table 8. The table shows that the L* value generally decreased as the Direct Blue 199 concentration increased. The a* and b* values decreased as the Direct Blue 199 concentration increased.

TABLE 8

| Ex. No. | L* | a* | b* |
|---|---|---|---|
| Ex. 11 | 33.62 | 2.80 | −5.17 |
| Ex. 15 | 32.74 | 2.53 | −5.33 |
| Ex. 16 | 33.38 | 2.02 | −5.61 |
| Ex. 17 | 32.02 | 1.22 | −5.74 |
| Ex. 18 | 31.74 | −0.25 | −6.34 |
| Ex. 19 | 30.77 | −1.63 | −7.70 |
| Ex. 20 | 30.70 | −1.00 | −7.35 |

Color Imparting Mixture—Reactive Black 31 & Acid Blue 9

To determine the effect of the addition of Acid Blue 9 dye on the reflectivity of the 5 percent Reactive Black 31 dye ink composition described in Example 1, several compositions containing Acid Blue 9 dye of differing concentrations were made. These compositions are described in Examples 21 through 26.

EXAMPLE 21

Figure 5:
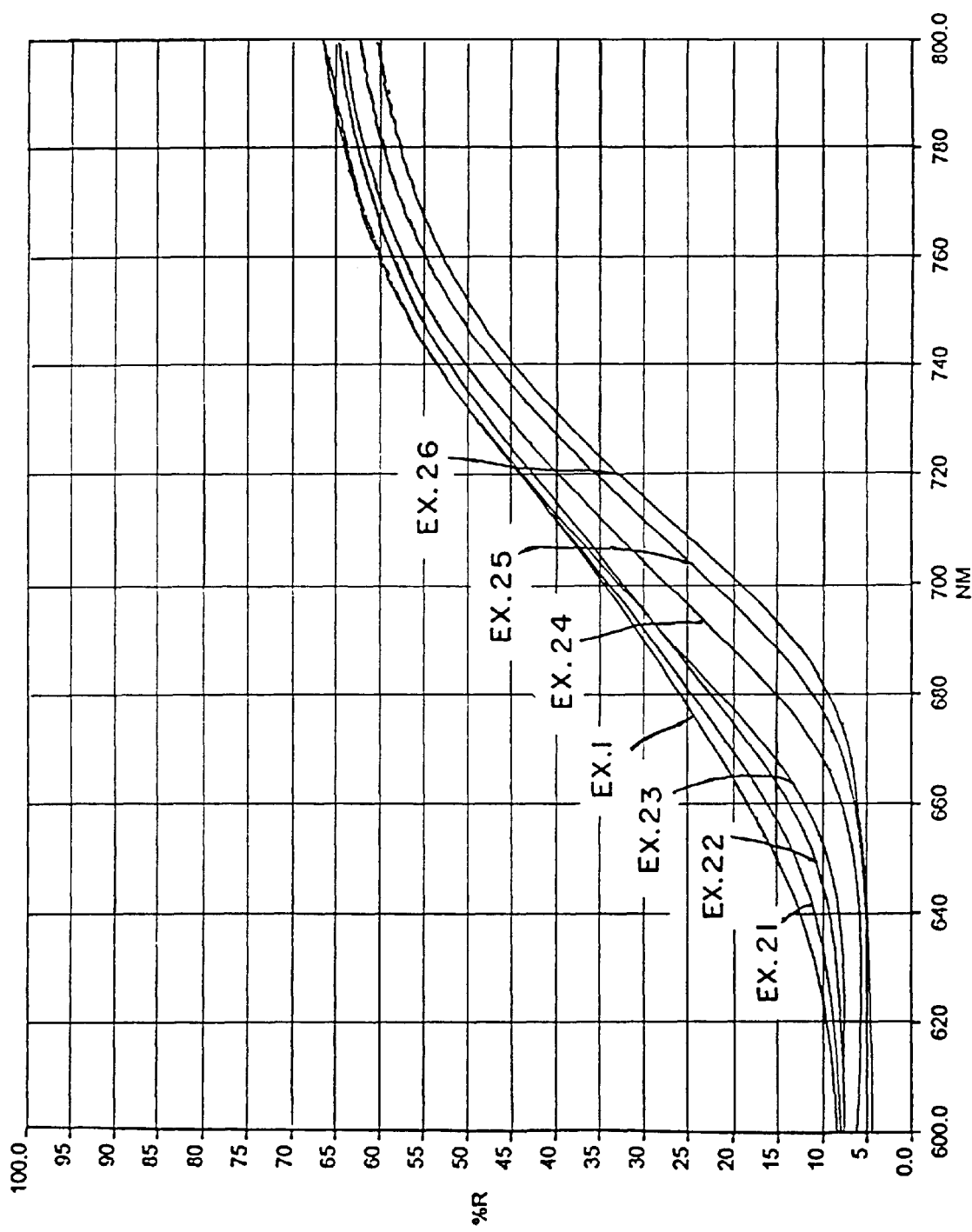
FIG. 5 is a graphical plot of reflectance values versus wavelength comparing ink jet ink compositions showing the effect of Acid Blue 9 dye on the reflectance of an ink formed with Reactive Black 31 dye.

A ink jet printer ink composition was made by combining about 1.668 g of the Duasyn Black KRL SF 15 percent Reactive Black 31 dye solution with 3.333 grams of the solvent system and about 0.005 g of Acid Blue 9 dye. The resulting concentration of Acid Blue 9 in the composition was about 0.1 weight percent. The Acid Blue 9 dye is available from Pylam Product Co., Inc., 275 East Cedar St. Tempe, Ariz. This composition was drawn down onto a piece of commercially available copier paper using the technique described in Example 1. A plot of the reflectance versus wavelength of the composition of Example 21 is shown in FIG. 5. The optical density and the PRD and PCR values for the green and red filters are listed in TABLE 9 below.

EXAMPLE 22

Another ink jet printer ink composition was made by combining about 1.668 g of the Duasyn Black KRL SF 15 percent Reactive Black 31 dye solution with 3.323 grams of the solvent system and about 0.015 g of Acid Blue 9 dye. The resulting concentration of Acid Blue 9 in the composition was about 0.3 weight percent. This composition was drawn down onto a piece of commercially available copier paper using the technique described in Example 1. A plot of the reflectance versus wavelength of the composition of Example 22 is shown in FIG. 5. The optical density and the PRD and PCR values for the green and red filters are listed in TABLE 9 below.

EXAMPLE 23

An ink jet printer ink composition was made by combining about 1.668 g of the Duasyn Black KRL SF 15 percent Reactive Black 31 dye solution with 3.303 grams of the solvent system and about 0.035 g of Acid Blue 9 dye. The resulting concentration of Acid Blue 9 in the composition was about 0.7 weight percent. This composition was drawn down onto a piece of commercially available copier paper using the technique described in Example 1. A plot of the reflectance versus wavelength of the composition of Example 23 is shown in FIG. 5. The PRD and PCR values for the green and red filters and the optical density are listed in TABLE 9 below.

EXAMPLE 24

An ink jet printer ink composition was made by combining about 1.668 g of the Duasyn Black KRL SF 15 percent Reactive Black 31 dye solution with 3.238 grams of the solvent system and about 0.1 g of Acid Blue 9 dye. The resulting concentration of Acid Blue 9 in the composition was about 2.0 weight percent. This composition was drawn down onto a piece of commercially available copier paper using the technique described in Example 1. A plot of the reflectance versus wavelength of the composition of Example 24 is shown in FIG. 5. The PRD and PCR for the green and red filters are listed in TABLE 9 below.

EXAMPLE 25

Another ink jet printer ink composition was made by combining about 1.668 g of the Duasyn Black KRL SF 15 percent Reactive Black 31 dye solution with 3.138 grams of the solvent system and about 0.2 g of Acid Blue 9 dye. The resulting concentration of Acid Blue 9 in the composition was about 4.0 weight percent. This composition was drawn down onto a piece of commercially available copier paper using the technique described in Example 1. A plot of the reflectance versus wavelength of the composition of Example 25 is shown in FIG. 5. The optical density and the PRD and PCR values for the green and red filters are listed in TABLE 9 below.

EXAMPLE 26

An ink jet printer ink composition was made by combining about 1.668 g of the Duasyn Black KRL SF 15 percent Reactive Black 31 dye solution with 3.038 grams of the solvent system and about 0.3 g of Acid Blue 9 dye. The resulting concentration of Acid Blue 9 in the composition was about 4.0 weight percent. This composition was drawn down onto a piece of commercially available copier paper using the technique described in Example 1. A plot of the reflectance versus wavelength of the composition of Example 26 is shown in FIG. 5. The PRD and PCR values for the green and red filters as well as the optical density are listed in TABLE 9 below.

TABLE 9

| Ex. No. | Wt % AB 9 | Optical Density | PRD Green | PCR Green | PRD Red | PCR Red |
| --- | --- | --- | --- | --- | --- | --- |
| Ex. 1 | 0% | 1.030 | 49% | .65 | 54% | .72 |
| Ex. 21 | 0.1% | 1.040 | 50% | .64 | 57% | .73 |
| Ex. 22 | 0.3% | 1.070 | 51% | .66 | 59% | .75 |
| Ex. 23 | 0.7% | 1.040 | 51% | .66 | 59% | .75 |
| Ex. 24 | 2% | 1.070 | 52% | .67 | 62% | .78 |
| Ex. 25 | 4% | 1.120 | 53% | .68 | 63% | .80 |
| Ex. 26 | 6% | 1.130 | 54% | .70 | 64% | .82 |

Comparing the several reflectance versus wavelength plots of the various compositions in FIG. 5 shows that the addition of the Acid Blue 9 dye material also significantly reduced the reflectance of the ink composition containing Reactive Black 31 dye in the 600 to 800 nm region, and particularly in the 650 to 700 nm region, resulting in a flatter reflectance across the spectrum. The reduction in reflectance increased as the concentration of the Acid Blue 9 dye in the Reactive Black 31 ink composition of Example 1 increased. The optical density of the ink compositions increased as the concentration of Direct Blue 199 increased, up to about 6 weight percent. As shown in TABLE 9, the PRD and PCR values for the green and red filters generally increased as the concentration of Acid Blue 9 increased.

The values for the CIELAB color space terms L*, a* and b* colors for Examples 1 and 21 through 26 are provided in Table 10. The table shows that the L* value decreased as the Acid Blue 9 concentration increased. The a* and b* values decreased as the Acid Blue 9 concentration increased.

TABLE 10

| Ex. No. | L* | a* | b* |
| --- | --- | --- | --- |
| Ex. No. 1 | 36.78 | 1.96 | −3.53 |
| Ex. No. 21 | 35.96 | 1.06 | −3.88 |
| Ex. No. 22 | 35.22 | −0.12 | −4.25 |
| Ex. No. 23 | 35.57 | −1.84 | −5.09 |
| Ex. No. 24 | 33.32 | −4.55 | −6.42 |
| Ex. No. 25 | 31.67 | −5.52 | −7.25 |
| Ex. No. 26 | 30.65 | −6.01 | −8.13 |

As can be seen in the disclosure, adding a cyan colorant material with carefully chosen absorptive properties to a black colorant material with a high "red" reflectance, the spectral reflectance in the "red" region of the spectrum can be lowered and the overall reflectance curve can be flattened. A flat spectral reflectance response provides better contrast and machine readability regardless of the source of illumination.

The above embodiments have been given by way of illustration only, and other embodiments of the instant invention will be apparent to those skilled in the art, from consideration of the detailed description herein. Accordingly, limitations on the instant invention are to be found only in the claims.

What is claimed is:

1. An ink jet printer ink composition suitable for printing machine readable indicia on a substrate, the composition comprising:
    a colorant imparting mixture comprising:
        a water soluble black colorant material adapted to absorb light in a wavelength range between about 400 to 650 nm;
        a water soluble cyan colorant material having a molar extinction coefficient of at least 10,000 at a wavelength maximum in the range of about 580 to 750 nm that expands the wavelength range of absorbance/reflectance of the black colorant material from 650 nm to 800 nm in order to increase the optical density and readability of the indicia;
    water;
    polyvinylpyrrolidone water soluble resin; and at least one organic solvent.

2. The composition of claim 1, wherein the wavelength maximum of the cyan colorant material is in the range about 620 to 680 nm.

3. The composition of claim 1, wherein the colorant imparting mixture present in the ink comprises up to 5 weight percent of the composition.

4. The color imparting composition of claim 3, wherein the weight ratio of the soluble black colorant to the water soluble cyan colorant material is in the range of 50 to 1 to about 5 to 6.

5. The ink composition of claim 1, wherein the at least one organic solvent is selected from the group consisting of 2-pyrrolidone, polyethylene glycol, and triethylene glycol mono-n-butyl ether.

6. The ink composition of claim 1, wherein the at least one organic solvent is a mixture of 2-pyrrolidone, polyethylene glycol, and triethylene glycol mono-n-butyl ether.

7. An ink jet printer ink composition suitable for printing machine readable indicia on a substrate, the composition comprising:
    a colorant imparting mixture comprising:
        a black colorant material selected from the group consisting of Reactive Black 31 and Direct Black 195,
        a cyan colorant material selected from the group consisting of Direct Blue 199, Direct Blue 307 and Acid Blue 9 that expands the wavelength range of absorbance/reflectance of the black colorant material from 650 nm to 800 nm in order to increase the optical density and readability of the indicia;
    water;
    polyvinylpyrrolidone water soluble resin; and
    at least one organic solvent.

8. The ink composition of claim 7, wherein the color imparting mixture present in the ink comprises approximately 5 weight percent of the composition.

9. The color imparting composition of claim 8, wherein the weight ratio of the black colorant material to the cyan colorant material is in the range of about 50 to 1 to about 5 to 6.

10. The ink composition of claim 7, wherein the at least one organic solvent is selected from the group consisting of 2-pyrrolidone, polyethylene glycol, and triethylene glycol mono-n-butyl ether.

11. The ink composition of claim 10, wherein the at least one organic solvent is a mixture of 2-pyrrolidone, polyethylene glycol, and triethylene glycol mono-n-butyl ether.

* * * * *